United States Patent Office 2,923,721
Patented Feb. 2, 1960

2,923,721

METHOD OF PREPARING 3-KETO Δ¹,⁴ STEROIDS

Robert Joly, Montmorency, Julien Warnant, Neuilly sur Seine, Gerard Nomine, Noisy le Sec, and Daniel Bertin, Montrouge, France, assignors to Les Laboratoires Francais de Chimiotherapie, Paris, France, a French body corporate No Drawing. Application December 10, 1956
Serial No. 627,113

Claims priority, application France December 13, 1955

13 Claims. (Cl. 260—397.3)

This invention relates to a method of preparing unsaturated ketosteroids.

Of the steroid hormones possessing cortisone activity that are used therapeutically, Δ¹-dehydrocortisone (prednisone) and Δ¹-dehydrocortisol (prednisolone) have become very important within the recent past. Other 1,4-diene 3-ketosteroids, such as the Δ¹-dehydro compound S (17α,21-dihydroxyΔ¹,⁴-pregnadiene 3,20 dione), or, for a longer time past, estrogens, such as Δ¹,⁴-androstadienolone or similar derivatives, constitute intermediary products for preparing either one of the above-mentioned compounds.

In order to prepare Δ¹,⁴-3-ketosteroids of the androstadiene or pregnadiene series, either micro-biological methods may be used in taking advantage of the dehydrogenizing properties of enzymes produced by certain microorganisms as was demonstrated by Vischer, Meystre and Wettstein (Helv. Chim. Acta, 1955, 38, 835) as well as by Hershberg et al. (J. Am. Chem. Soc., 1955, 77, 4184), or the desired diene ketosteroid can be obtained by double dehydrohalogenation of the corresponding 2,4-dihalogen derivative according to the following reaction scheme:

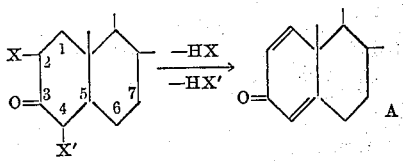

wherein X and X' represent halogens which may or may not be identical.

This double dehydrohalogenation constitutes the ultimate or penultimate step in the synthesis of the desired diene compound and thus occurs at a moment when the yield, and especially the purity of the product, have a decisive influence on the cost and efficiency of production.

When dehydrohalogenating these 2,4-dihalogen derivatives by the usual methods (such as treating with collidine, preparing dinitrophenylhydrazones or semicarbazones thereof, or treating with lithium halides in dimethylformamide according to the method of Holysz [J. Am. Chem. Soc., 1953, 75, 4432]), various difficulties are encountered, outstanding amongst them the simultaneous migration of the double bond from the 1,2- to the 6,7-position. Our findings in this respect have been corroborated by Fried et al. (J. Am. Chem. Soc., 1955, 77, 4182 note 14). In fact, these authors recommend, as a preferred method of preparing, say, 6-dehydro 9α-fluoro hydrocortisone acetate, the action of lithium chloride in the presence of dimethylformamide on the corresponding 2,4-dibromo derivative. The aforementioned difficulties increase, in the case of preparing the dinitrophenylhydrazone or semicarbazone intermediate, by the resistance of these compounds against splitting off by the diene hydrazone. The presence of the undesirable 4,6 diene is immediately revealed when examining the ultra-violet spectrum of the resulting product, showing the presence of two maximum absorptions, very often at a preponderance of the 4,6 diene.

Since, under these conditions, the reaction product consists of a mixture of 1,4- and 4,6-dienes and, in addition, a certain amount of unchanged starting product, laborious purifications by means of either extensive fractional crystallization or by means of chromatographic methods become necessary and the yield of the desired 1,4-diene is often rather low. Herzog et al. (J. Am. Chem. Soc., 1955, 77, 4782), for example, started from 20 g. of 17α-hydroxy 21-acetoxy pregnane 3,11,20-trione and produced, after dibromination and dehydrobromination, only 2.4 g. of Δ¹-dehydrocortisone acetate.

In the copending patent application Serial No. 360,878 of June 11, 1953, a method of preparing α-brominated ketosteriods has been described which is particularly suitable for producing allo- and normal-2,4-dibrominated 3-ketosteriods, and especially facilitates the preparation of 2,4-dibromo androstane 3,17-dione, of 17-esters of 2,4-dibromo androstanol 3-one and the 2,4-dibromo 17α- hydroxy pregnane 3,11,20-trione.

Other 2,4-dibrominated 3-ketosteroids have been described in the following copending patent applications:

Ser. No. 577,208 of April 10, 1956, relating to the preparation of levorotatory 2,4-dibromo 17α-hydroxy 21-acetoxy pregnane 3,11,20-trione.

Application Ser. No. 577,321 of April 10, 1956, which describes the preparation of the two stereoisomeric forms of 17α-hydroxy 2,4,21-tribromo pregnane 3,11,20-trione and one of the stereoisomeric forms of 17α-hydroxy 2,4, 21-tribromo pregnane 3,11,20-trione.

Application Serial No. 595,097 of July 2, 1956, wherein the preparation of 2,4-dibromo 11β, 17α-dihydroxy 21acetoxy pregnane 3,20-dione has been claimed.

It is the principal object of the present invention to provide a process of double dehydrohalogenating allo- or normal-2,4-dihalogenated 3-ketosteroids of Formula A which constitute the class consisting of the androstane, etiocholane, allo-pregnane and pregnane series as well as all derivatives thereof substituted in the 17-position.

Moreover, these ketosteroids may have other substituents in the B, C and D rings, particularly free or esterified hydroxyl groups, free or substituted carbonyl groups and, if they belong to the pregnane or allo-pregnane series, their lateral chain may comprise a carbonyl or an enolic ester at the 20-position, or a free or halogenated methyl group or an acyloxy group at the 21-position.

In contrast to the afore-mentioned prior methods, the herein claimed process has the unexpected and unobvious advantage of providing, practically exclusively, the desired 1,4-diene. Spectrographical analysis of the reaction products indicates the absence of any 4,6-isomer which is easily detected by its characteristic maximum absorption that differs from the maximum absorption of the 1,4-diene.

This object and advantage is attained by means of using lithium carbonate. We found that, if a 2,4-dihalogen 3-ketosteroid is heated with an excess (generally the same weight) of lithium carbonate, in pulverulent form, in the presence of dimethylformamide, lithium halide is formed at the same time as the double dehydrohalogenation at the 1,4-position takes place, without any simultaneous formation of the respective 4,6-diene. The reaction, which is rather slow at the beginning, progresses more rapidly, provided there is always an excess of lithium carbonate present. Since the latter is not soluble in the reaction medium, it must be kept suspended by vigorous stirring in order to neutralize any trace of free hydracid in the medium. After precipitating with an aqueous acid solution in order to dissolve the lithium carbonate, the desired diene ketosteroid is obtained, which is generally pure after a single recrystallization. The yields are high.

An improvement of the foregoing process consists in the use of a prepared lithium halide-lithium carbonate couple, whereby the reaction is greatly accelerated.

The herein-following examples are presented to illustrate the present invention, but in no way to limit the scope of the appended claims.

EXAMPLE 1

Dehydrobromination of 2,4-dibromo androstane 17β-ol 3-one 17-benzoate

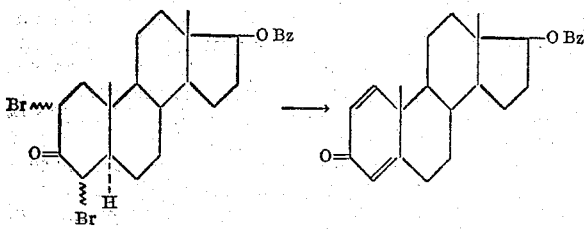

(a) *By means of lithium bromide only.*—2.6 g. (0.03 mol) of anhydrous lithium bromide are added to 50 cc. of dimethylformamide.

A nitrogen stream is passed through the solution, 5.52 g. (0.01 mol) of 2,4-dibromo androstane 17β-ol 3-one 17-benzoate are added, and the solution is heated for two hours to 90–95° C. while continuously stirring and adding nitrogen. The solution is cooled, poured into 200 cc. of water and the resulting product is treated as under (b); M.P.=180° C. According to the ultra-violet spectrum:

λ max. 231.5 mμ at ε=18,000
λ min. 251 mμ at ε=9,250
λ max. 283.5 mμ at ε=16,900 the dehydrobromination product contains 60–61% $\Delta^{4,6}$-androstadiene 17β-ol 3-one 17-benzoate and 36–37% $\Delta^{1,4}$-androstadiene 17β-ol 3-one 17 benzoate.

(b) *By means of a lithium bromide-lithium carbonate couple.*—2.6 g. (0.03 mol) of anhydrous lithium bromide and 2.2 g. (0.03 mol) of anhydrous lithium carbonate are added to 50 cc. of dimethylformamide.

A nitrogen stream is passed through the solution and 5.52 g. (0.01 mol) of 2,4-dibromo androstane 17β-ol 3-one 17 benzoate (as described in Example 5 of application Serial No. 360,878 of June 11, 1953) are added; the mixture is heated for 15 hours to 90–95° C. while stirring continuously and without interrupting the addition of nitrogen gas. The solution is then cooled to room temperature and poured into 200 cc. of water containing 5 cc. of acetic acid. After separating the precipitate, washing with water, drying and recrystallizing in acetone, 3.1 g. of $\Delta^{1,4}$-androstadiene 17β-ol 3-one 17-benzoate are obtained, representing a yield of 80%; M.P.=221° C., $[\alpha]_D^{20}=+122°$ (c.=1%, chloroform), λ max. 235 mμ at ε=25,450; λ 283.5 mμ at ε=1,500. The product thus does not include any 4,6-diene.

EXAMPLE 2

Dehydrobromination of 2,4-dibromoandrostane 3,17-dione

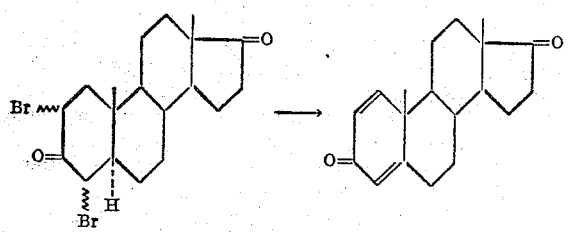

(a) *By means of lithium chloride only.*—1 g. (0.025 mol) of anhydrous lithium chloride are added to 20 cc. of dimethylformamide.

A nitrogen stream is passed through the solution and 1.78 g. of 2,4-dibromo androstane dione, $[\alpha]_D=+39°$ (c.=1%, chloroform), (as described in Example 6 of application Serial No. 360,878 of June 11, 1953) are added. After continuing the addition of nitrogen and stirring and heating to 95° C. for two hours, the solution is cooled and poured into 200 cc. of water and the resulting precipitate is filtered with suction, washed with water and dried. 0.82 g. of a product are obtained having a M.P. of 146° C., $[\alpha]_D^{20}=+126°$ (c.=1%, ethanol). According to the ultra-violet spectrum:

λ max. 280 mμ at ε=17,450
λ inf. 245 mμ at ε=6,000 the product comprises 64–65% $\Delta^{4,6}$-androstadiene 3,17-dione and 8% $\Delta^{1,4}$-androstadiene 3,17-dione.

(b) *By means of lithium chloride-lithium carbonate couple.*—The foregoing process is repeated, excepting that 2 g. of lithium carbonate are introduced at the start. The resulting product consists only of $\Delta^{1,4}$-androstadiene 3,17-dione, M.P.=139° C., $[\alpha]_D^{20}=+144°$ (c.=1%, chloroform). λ max. 244 mμ at ε=16,200.

EXAMPLE 3

Dehydrobromination of 2,4-dibromo etiocholane 17β-ol-one 17-acetate

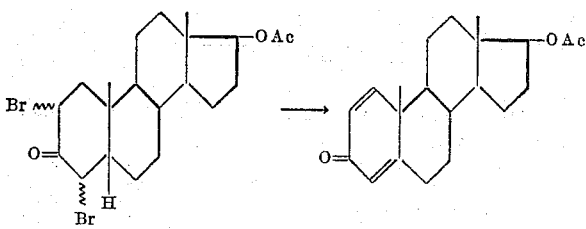

(a) *By means of lithium chloride only.*—The dibrominated derivative used as starting material is prepared according to the process described in the application Serial No. 360,878 of June 11, 1953, in the following manner:

10 g. of 3α-hydroxy 17β-acetoxy etiocholane are dissolved at 60° C. in 100 cc. of acetic acid containing 3.4 cc. of benzyl alcohol, and 23.5 g. of N-bromosuccinimide are added. The temperature is kept at 60° C. The solution, which at first is red due to the presence of the bromine, becomes colorless at the end of 15 minutes after oxidation of the hydroxyl in the 3-position and of the benzyl alcohol. The desired dibromo derivative crystallizes. The mixture is poured into ice water containing sodium bisulfite. After filtering with suction the precipitate, washing with water, then with ether in order to eliminate the benzoic aldehyde, and drying, 14 g. of crude 2,4-dibromo etiocholane 17β-ol 3-one 17-acetate are obtained, representing a yield of 95%; M.P.=251° C., $[\alpha]_D^{20}=+9°$ (c.=1%, chloroform). After impasting with acetic acid, filtering with suction and drying, 13.1 g. of the pure product are obtained. M.P.=255° C., $[\alpha]_D^{20}=+9°$ (c.=1%, chloroform).

*Analysis.*—$C_{21}H_{30}O_3Br_2$. Calculated: 51.44% C; 6.17% H; 9.79% O; 32.6% Br. Found: 51.4% C; 6.2% H; 10.1% O; 32.3% Br.

1.26 g. (0.03 mol) of anhydrous lithium chloride are added to 50 cc. of dimethylformamide. While stirring and passing a nitrogen stream through the solution, 4.9 g. of the afore-described dibromo derivative are introduced and the solution is heated to 100° C. for two hours while stirring and maintaining the nitrogen supply. The solution is then cooled to room temperature and poured into 250 cc. of water. Upon filtering with suction the resulting precipitate, washing with water and drying, a product is obtained having the following ultra-violet spectrum:

λ max. 282 mμ at ε=15,400
infl. 245 mμ at ε=6,750

The product contains 22% of Δ¹,⁴-androstadienolone 17-acetate and 45% of Δ⁴,⁶-androstadienolone 17-acetate. Whether the dehydrobromination is carried out by means of lithium chloride or lithium bromide, the crude dehydrobromination product always contains 2 to 3% of halogen. Upon recrystallization, a third product is isolated, consisting of 2-bromo Δ¹-etiocholene 17β-ol 3-one 17-acetate, M.P.=215° C., $[\alpha]_D^{20}$=80° (c.=1%, chloroform) with λ max. 252 mμ at $$E_{1cm}^{1\%} = 213$$

(b) *By means of a lithium bromide-lithium carbonate couple.*—5.2 g. (0.06 mol) of anhydrous lithium bromide and 4.5 g. (0.06 mol) of anhydrous lithium carbonate are added to 100 cc. of dimethylformamide.

While the mixture is stirred and a nitrogen current is passed through, 4.9 g. of the afore-described 2,4-dibromo etiocholane 17β-ol 3-one 17-acetate (0.01 mol) are added, and the solution is boiled and refluxed for one hour. The mixture is then cooled and poured into 300 cc. of ice water containing 10 cc. of acetic acid. The resulting precipitate is filtered with suction, washed with water and dried. 3.2 g. (or a yield of 98%) of Δ¹,⁴-androstadiene 17β-ol 3-one 17-acetate are obtained; M.P=151° C. Purification by impasting with isopropyl ether, filtering with suction and drying produces 3.02 g. (or a yield of 92%) of the pure product, M.P.=152.5° C., $[\alpha]_D^{20}$=+30° (c.=1%, ethanol), λ max. 245 mμ at ε=15,100, which indicates the complete absence of the 4,6 diene. Operating under identical conditions, but with only 0.087 g. (0.001 mol) of lithium bromide per 4.5 g. (0.06 mol) of lithium carbonate and 4.9 g. (0.01 mol) of 2.4-dibromo etiocholane 17β-ol 3-one 17-acetate, 3.2 g. (98% yield) of Δ¹,⁴-androstadiene 17β-ol 3-one 17-acetate are obtained; M.P.=150° C., $[\alpha]_D^{20}$=+32.5° (c.=1%, ethanol). After purification with isopropyl ether there remain 2.95 g. (90%), M.P. (instantaneous)=152.5° C., $[\alpha]_D^{20}$=+30° (c.=1%, ethanol).

(c) *By means of lithium carbonate only.*—40 cc. of dimethylformamide are heated to 100° C.; while stirring and passing a nitrogen current through the liquid, 2 g. of anhydrous lithium carbonate are added, and then 2 g. of 2,4-dibromo 17β-acetoxy etiocholane 3-one. The mixture is refluxed for one hour and, after cooling, filtered and poured into water. The resulting precipitate is washed and recrystallized in ethyl acetate. A yield of 42% of 17β-acetoxy Δ¹,⁴-androstadiene 3-one is obtained; M.P.=152° C., $[\alpha]_D^{20}$=+32°±2 (c.=2%, chloroform); λ max. 244.5 mμ ε=15,700; indicating the absence of any 4,6 diene.

EXAMPLE 4

*Dehydrobromination of 2,4-dibromo 17α-hydroxy pregnane 3,11,20-trione by means of a lithium bromide-lithium carbonate couple*

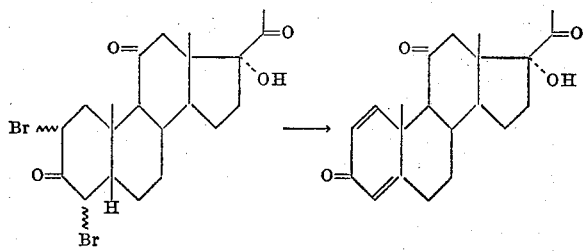

0.87 g. (0.01 mol) of anhydrous lithium bromide and 4.5 g. (0.06 mol) of anhydrous lithium carbonate are added to 50 cc. of dimethylformamide.

While stirring and passing a nitrogen current through the liquid, 5.04 g. of 2,4-dibromo 17α-hydroxy pregnane 3,11,20-trione, M.P.=245°, $[\alpha]_D^{20}$=+62° (c.=1%, acetone), are added, prepared according to Example 4 of application Serial No. 360,878 of June 11, 1953. The mixture is heated to 95–100° C. for 15 hours while stirring and maintaining the nitrogen supply. After cooling, the mixture is poured into 500 cc. of water containing 10 cc. of acetic acid. The resulting precipitate is filtered with suction, washed with water and dried, producing 3.08 g. of the hitherto unknown 17α-hydroxy Δ¹,⁴-pregnadiene 3,11,20-trione (equivalent to a yield of 90%), M.P.=242° C., $[\alpha]_D^{20}$=+150° (c.=1%, chloroform).

*Analysis.*—$C_{21}H_{26}O_4$=342.42. Calculated: 73.66% C; 7.65% H; 18.69% O. Found: 73.6% C; 7.7% H; 18.7% O.

The ultra-violet spectrum (λ max. 239.5 mμ ε=14,650) indicates the absence of any 4,6 diene, near 283 mμ.

EXAMPLE 5

*Dehydrobromination of 2,4-dibromo 17α-hydroxy 21-acetoxy pregnane 3,11,20-trione*

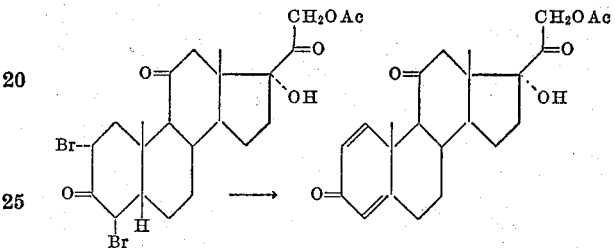

(a) *By means of lithium bromide.*—2.6 g. (0.03 mol) of anhydrous lithium bromide are added to 35 cc. of dimethylformamide; to this are added, while stirring and passing a nitrogen current, 5.6 g. (0.01 mol) of 2α,4β-dibromo 17α-hydroxy 21-acetoxy pregnane 3,11,20-trione, $[\alpha]_D^{20}$=−19° (c.=0.5%, acetone), described in Example 7 of application Serial No. 577,208 of April 10, 1956. The mixture is heated for three hours to 90–95° C. under nitrogen atmosphere. It is then cooled and poured into 200 cc. of water, and the resulting precipitate is separated, washed with water and dried, producing 2.8 g. (or a yield of 70%) of crude Δ¹-dehydrocortisone 21-acetate contaminated with resinous impurities. Purification with acetone produces 2 g. (or a yield of 50%) of a product, the ultra-violet spectrum of which indicates the presence of 80% of Δ¹-dehydrocortisone acetate and 10% of Δ⁶-dehydrocortisone acetate.

λ max. 240 mμ at ε=12,200
Infl. 285 mμ at ε=2,900
Infl. 340 mμ at ε=800

(b) *By means of lithium carbonate only.*—While 35 cc. of dimethylformamide are stirred and a nitrogen stream is passed through, 4.5 g. (0.06 mol) of anhydrous lithium carbonate and, thereafter, 5.6 g. of 2α,4β-dibromo 17α,21-acetoxy pregnane 3,11,20-trione (0.01 mol) are added. The solution is heated to 95–100° C. for 50 hours while stirring and maintaining the nitrogen supply. The mixture is cooled and poured into 200 cc. of water and 10 cc. of acetic acid. Filtering with suction the resulting precipitate, washing with water and drying produces 3.6 g. (or a yield of 90%) of crude Δ¹-dehydrocortisone 21-acetate which is free from any resinous impurity. The ultra-violet spectrum:

λ max. 239.5 mμ at ε=11,000
λ 285 mμ at ε=700 indicates that the produce comprises 70% of Δ¹-dehydrocortisone acetate and that no 4,6 diene is present. There remain about 20% of unconverted starting material.

(c) *By means of a lithium bromide-lithium carbonate couple.*—2.6 g. (0.03 mol) of anhydrous lithium bromide and 4.5 g. (0.06 mol) of anhydrous lithium carbonate are added to 35 cc. of dimethylformamide.

Stirring vigorously and passing a stream of nitrogen through the mixture, 5.6 g. (0.01 mol) of 2α,4β-dibromo 17α-hydroxy 21-acetoxy pregnane 3,11,20-trione are added, and the solution is heated to 95° C. for 15 hours while stirring and continuously maintaining the nitrogen supply. The mixture is cooled and poured into 200 cc. of water and 10 cc. of acetic acid. Upon filtering with suction the resulting precipitate, washing with water and drying, 3.92 g. (or a yield of 98%) of practically pure Δ¹-dehydrocortisone acetate are obtained; M.P.= 222–232° C., [α]$_D^{20}$=+183° (c.=1%, dioxane), λ max. 239.5 mμ at ε=14,300, λ 285 mμ at ε=600. The corresponding 4,6 diene is thus absent. The product is purified for analytical purposes by recrystallization in acetone. 3.6 g. (or a yield of 90% of Δ¹-dehydrocortisone acetate of extreme purity are obtained; M.P. 225–235° C., [α]$_D^{20}$=+185° (c.=1%, dioxane), λ max. 239.5 mμ at ε=14,950, λ 285 mμ at ε=600.

EXAMPLE 6

Dehydrobromination of 2α,4β-dibromo 17α-hydroxy 21-acetoxy pregnane 3,20-dione by means of a lithium bromide-lithium carbonate couple

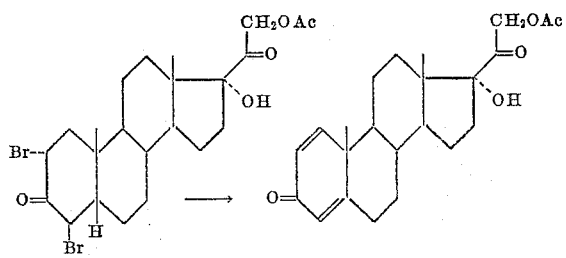

The starting product, 2α,4β-dibromo, 17α-hydroxy 21-acetoxy pregnane 3,20-dione, is prepared by brominating in dioxane as described in the patent applications cited in column 2, lines 14–34.

39 g. (0.1 mol) of 17α-hydroxy 21-acetoxy pregnane 3,20-dione, M.P.=197° C., [α]$_D^{20}$=+68°±2 (c.=1%, ethanol) are dissolved in 600 cc. of anhydrous dioxane. After adding 1 cc. of acetic acid containing 50% of dry hydrobromic acid, 36 g. of bromine in 100 cc. of acetic acid are rapidly introduced. The temperature rises about 10° C. After making sure that the bromine has been absorbed, 300 cc. of distilled water are added. The solution obtained in this manner is slowly poured into 6 liters of water while stirring. The dibrominated product that precipitates is filtered with suction, washed with water, and dried under vacuum at room temperature. 54 g. of the crude product are obtained, comprising 29 to 29.5% of bromine (theoretically 29.2%). Recrystallization in an ethyl-acetate-hexane mixture produces pure 2α,4β-dibromo 17α-hydroxy 21-acetoxy pregnane 3,20-dione, [α]$_D^{20}$=−16°±4 (c.=0.5%, acetone) which is a new compound.

Calculated: 29.2% Br. Found: 29.1% Br.

The same compound can be produced, at similar yields, from 4-bromo 17α-hydroxy 21-acetoxy pregnane 3,20-dione by bromination under the afore-described conditions.

2.6 g. (0.03 mol) of anhydrous lithium bromide and 3 g. (0.04 mol) anhydrous lithium carbonate are added to 35 cc. of dimethylformamide.

The suspension is stirred under a nitrogen atmosphere and 5.4 g. of the afore-described 2α,4β-dibromo 17α-hydroxy 21-acetoxy pregnane 3,20-dione are added. The reaction mixture is heated to 95–100° C. for 20 hours while stirring without interrupting the stream of nitrogen. The mixture is cooled and poured into 100 cc. of water and 10 cc. of acetic acid. The resulting precipitate is filtered with suction, washed with water and dried, producing 3.7 g. of the 21-acetate of the Δ¹-dehydro substance S. The product is purified by recrystallization in an acetone-hexane mixture and yields 2.7 g. of 21-acetoxy 17α-hydroxy Δ¹,⁴-pregnadiene 3,20-dione, M.P.= 227° C., [α]$_D^{20}$=+78° (c.=0.5%, acetone); ultraviolet spectrum λ max. 245.5 mμ at ε=14,650.

Saponification of the acetate produces the Δ¹-dehydro substance S, M.P.=258° C.

Analysis.—C₂₁H₂₈O₄=344.44. Calculated: 73.22% C; 8.19% H. Found: 73.0% C; 8.2% H.

Ultra-violet spectrum λ max. 245 mμ at ε=15,280. The product does not contain any 4,6 diene.

EXAMPLE 7

Dehydrobromination of 2α,4β-dibromo 11β,17α-dihydroxy 21-acetoxy pregnane, 3,20-dione by means of a lithium bromide-lithium carbonate couple

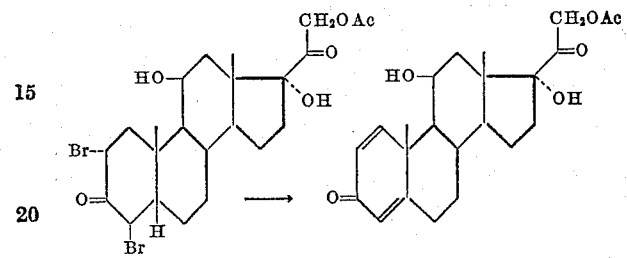

1.75 g. of anhydrous lithium bromide and 1.75 g. of dry lithium carbonate are added to 36 cc. of dimethylformamide while stirring and passing a stream of nitrogen through the liquid. To this mixture are added, without interrupting the stirring and the passage of the nitrogen gas, 3.6 g. of 2α,4β-dibromo 11β,17α-dihydroxy 21-acetoxy pregnane 3,20-dione, [α]$_D^{20}$=0°±2 (c.=0.5%, acetone). After heating to 97° C. for 15 hours without interrupting the stirring and the nitrogen supply, the mixture is cooled and poured into 350 cc. of ice water and 3 cc. of acetic acid. The resulting precipitate is filtered with suction, washed with water, and dried, resulting in 2.4 g., or a yield of 93%, of crude Δ¹-dehydrocortisol acetate. Recrystallization in acetone produces pure Δ¹-dehydrocortisol acetate, M.P.=244° C., [α]$_D^{20}$=+115° (c.=1%, dioxane) λ max. 243 mμ at ε=14,400.

EXAMPLE 8

Dehydrobromination of 2β,4β,21-tribromo 17α-hydroxy pregnane 3,11,20-trione by means of a lithium bromide-lithium carbonate couple

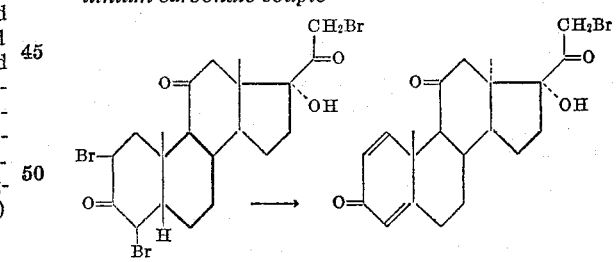

5.83 g. (0.01 mol) of 2β,4β,21-tribromo 17α-hydroxy pregnane 3,11,20-trione, [α]$_D^{20}$=+83.5° (c.=1%, acetone), M.P. (decomposition)=231° C., described in Example 1 of application Serial No. 577,321 of April 10, 1956, are dissolved in 60 cc. of dimethylformamide. After adding 6 g. of anhydrous lithium carbonate (0.08 mol) and 2.9 g. (0.033 mol) of anhydrous lithium bromide while stirring and passing a stream of nitrogen through the mixture and refluxing for 10 minutes, without interrupting the stirring and the nitrogen supply, the mixture is cooled and poured into ice water containing 20 cc. of acetic acid. The resulting precipitate is filtered with suction, washed with water and dried under vacuum, resulting in 3.35 g. of a crude product (or a yield of 80%), [α]$_D^{20}$=+171 (c.=1%, dimethylformamide). The ultra-violet spectrum shows: λ max.=239 mμ at ε=14,800. After impasting with acetone, pure 21-bromo 17α-hydroxy Δ¹,⁴-pregnadiene 3,11,20-trione is obtained; M.P. (decomposition)=251° C., [α]$_D^{20}$=+177° (c.= 1%, dimethylformamide), λ max. 239 mμ at ε=15,000.

Analysis.—C₂₁H₂₅O₄Br=421.33. Calculated: 59.85%

C; 5.98% H; 15.19% C; 18.97% Br. Found: 60.1% C; 6% H; 15.4% C; 18.95% Br.

EXAMPLE 9

*Dehydrobromination of 2α,4β-21-tribromo 17α-hydroxy pregnane 3,11,20-trione by means of a lithium bromide-lithium carbonate couple*

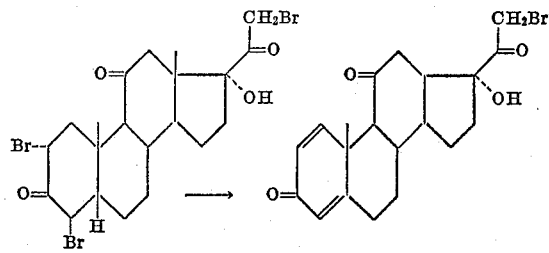

2α,4β,21-tribromo 17α-hydroxy pregnane 3,11,20-trione, $[\alpha]_D^{20} = -4°$ (c.=0.5%, acetone), M.P. (decomposition)=230–235° C., described in Example 2 of application Serial No. 577,321 of April 10, 1956, upon being treated under the conditions described in Example 8 produces pure 21-bromo 17α-hydroxy $\Delta^{1,4}$-pregnadiene 3,11,20-trione which is in every way identical with the compound described in the preceding example.

In the formulas of the foregoing examples

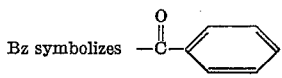

and

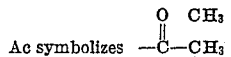

The melting points set forth in the foregoing examples are instantaneous melting points, obtained by means of the heated block method. All ultra-violet spectra are determined on ethanol solutions of the respective compounds.

Obviously, the invention is not limited to the foregoing examples. Thus, instead of using 2,4-dibromo derivatives, similar other dihalogenated products may be used, or derivatives having different halogens in the 2- and in the 4-position. As illustrated in the examples, when forming the complex, the ratio between lithium halide and lithium carbonate may vary within wide limits; for example, any excess of lithium carbonate is limited only by the consideration of costs and by the requirement that the mixture must facilitate an efficient agitation. In order to assure a satisfactory reaction speed, the amount of lithium halide present should be within the limits of 0.1 to 1 mol per mol of dihalo-ketosteroid. The optimum reaction temperature has been found to vary from 70° C. to refluxing temperature. The time required for the reaction ranges from 10 minutes to 20 hours.

We claim:

1. The method of preparing $\Delta^{1,4}$-diene 3-ketosteroids selected from the group consisting of $\Delta^{1,4}$-androstadiene-3-one and $\Delta^{1,4}$-pregnadiene-3-one from dihalogenated 3-ketosteroids selected from the group consisting of 2,4-dibromo etiocholane-3-one, 2,4-dibromo androstane-3 and 2,4-dibromo pregnane-3-one of the following general structure

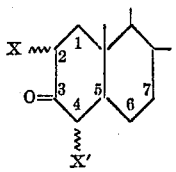

wherein X and X' represent halogen, said method comprising adding an amount of lithium carbonate corresponding to an amount between 3 moles and 6 moles per mole of the dihalogenated 3-ketosteroid to be dehydrohalogenated to dimethylformamide, stirring, passing a stream of nitrogen through the mixture, adding one of said dihalogenated 3-ketosteroids, heating to a temperature between 70° C. and refluxing temperature while continuing stirring and the addition of nitrogen, continuing said heating until dehydrohalogenation ceases, cooling, drowning in ice water acidified with acetic acid and separating the precipitated product.

2. The method of preparing $\Delta^{1,4}$-diene ketosteroids from dihalogenated 3-ketosteroids according to claim 1, wherein a lithium carbonate-lithium halide reaction couple is formed by adding said lithium carbonate in an amount corresponding to an amount between 3 moles and 8 moles per mole of dihalogenated ketosteroid to be dehydrohalogenated, and a lithium halide taken from the group consisting of lithium-chloride, -bromide and -iodide to said solvent, whereby an amount of said lithium halide is used which corresponds to an amount between 0.1 mole and 3 moles per mole of said subsequently added dihalogenated 3-ketosteroid.

3. The method of preparing, according to claim 1, 17β-benzoyloxy $\Delta^{1,4}$-androstadiene 3-one from 2,4-dibromo 17β-benzoyloxy androstane 3-one.

4. The method of preparing, according to claim 1, $\Delta^{1,4}$-androstadiene-dione from 2,4-dibromo androstane-dione.

5. The method of preparing, according to claim 1, 71β-acetoxy androstadiene 3-one from 2,4-dibromo 17β-acetoxy etiocholane 3-one.

6. The method of preparing, according to claim 1, 17α-hydroxy $\Delta^{1,4}$-pregnadiene 3,11,20-trione from 2,4-dibromo 17α-hydroxy pregnane 3,11,20-trione.

7. The method of preparing, according to claim 1, $\Delta^1$-dehydrocortisone from 2α,4β-dibromo 17α-hydroxy 21-acetoxy pregnane 3,11,20-trione.

8. The method of preparing, according to claim 1, 21-acetoxy 17α-hydroxy $\Delta^{1,4}$-pregnadiene 3,20-dione from 2α,4β-dibromo 17α-hydroxy 21-acetoxy pregnane 3,20-dione.

9. The method of preparing, according to claim 1, $\Delta^1$-dehydrocortisol from 2α,4β-dibromo 11β,17α-dihydroxy 21-acetoxy pregnane 3,20-dione.

10. The method of preparing, according to claim 1, 21-bromo $\Delta^{1,4}$-pregnadiene 3,11,20-trione from 2β,4β,21-tribromo 17α-hydroxy pregnane 3,11,20-trione.

11. The method of preparing, according to claim 1, 21-bromo $\Delta^{1,4}$-pregnadiene 3,11,20-trione from 2α,4β,21-tribromo 17α-hydroxy pregnane 3,11,20-trione.

12. In a process of preparing $\Delta^{1,4}$-diene-3-keto steroids by dehydrohalogenating 2,4-dihalo-3-keto steroids with a mixture of dimethyl formamide and a dehydrohalogenating agent at a temperature of between 70° C. and the refluxing temperature, the improvement which comprises using an amount of lithium carbonate corresponding to an amount between 3 moles and 6 moles per mole of dihalogenated ketosteroid to be dehydrohalogenated as said dehydrohalogenating agent.

13. In a process of preparing $\Delta^{1,4}$-diene-3-keto steroids by dehydrohalogenating 2,4-dihalo-3-keto steroids with a mixture of dimethyl formamide and a dehydrohalogenating agent at a temperature of between 70° C. and the refluxing temperature, the improvement which comprises using a preformed mixture consisting of from 3 moles to 8 moles of lithium carbonate and from 1 mole to 3 moles of lithium halide per mole of dihalogenated ketosteroid to be dehydrohalogenated as said dehydrohalogenating agent.

References Cited in the file of this patent

UNITED STATES PATENTS

| | | |
|---|---|---|
| 2,734,897 | Chemerda | Feb. 14, 1956 |
| 2,767,199 | Djerassi | Oct. 16, 1956 |
| 2,783,226 | Gould et al. | Feb. 26, 1957 |
| 2,824,100 | Long et al. | Feb. 18, 1958 |
| 2,837,541 | Hirschmann et al. | June 3, 1958 |